US006819169B1

(12) United States Patent
Kunc et al.

(10) Patent No.: US 6,819,169 B1
(45) Date of Patent: Nov. 16, 2004

(54) ISOLATION INTERFACE WITH CAPACITIVE BARRIER AND METHOD FOR TRANSMITTING A SIGNAL BY MEANS OF SUCH ISOLATION INTERFACE

(76) Inventors: Vinko Kunc, Gerbiceva 50, Ljubljana (SI), 1000; Andrej Vodopivec, Sojerjeva 63, Ljubljana (SI), 1000

(*) Notice: Subject to any disclaimer, the term of this patent is extended or adjusted under 35 U.S.C. 154(b) by 0 days.

(21) Appl. No.: 10/626,862

(22) Filed: Jul. 25, 2003

(30) Foreign Application Priority Data

Jan. 6, 2003 (SI) .......................... P-200300001

(51) Int. Cl.[7] .............................................. G06G 7/12
(52) U.S. Cl. ...................... 327/560; 379/93.05; 330/10
(58) Field of Search ................................ 327/560–561, 327/563–565; 330/10, 251–252; 379/93.01, 93.05, 93.08; 375/220

(56) References Cited

U.S. PATENT DOCUMENTS

| | | | | |
|---|---|---|---|---|
| 4,748,419 A | * | 5/1988 | Somerville | 330/10 |
| 4,835,486 A | | 5/1989 | Somerville | 330/10 |
| 6,137,827 A | * | 10/2000 | Scott et al. | 375/219 |
| 6,191,717 B1 | * | 2/2001 | Scott et al. | 341/143 |
| 6,198,816 B1 | * | 3/2001 | Hein et al. | 379/373.01 |
| 6,359,973 B1 | * | 3/2002 | Rahamim et al. | 379/93.05 |
| 6,728,320 B1 | * | 4/2004 | Khasnis et al. | 375/257 |

* cited by examiner

Primary Examiner—My-Trang Nuton
(74) Attorney, Agent, or Firm—Jacobson Holman PLLC

(57) ABSTRACT

A transmission of a signal through an isolation interface with a capacitive barrier is performed so that in an input circuit of the interface by integrating with an appropriate time constant the slope rates of the edges of signal replicas $U1o\pm$ of the transmitted input signal Ui are adjusted and that the said signal replicas are differentiated either in an appropriate differentiating unit, whereat the time constants of these differentiating units are shorter than the rising and falling-off times of the signal replicas and are advantageously in the order of magnitude of 1 nanosecond or below. Therefore, in a circuit on the output side of the capacitive barrier no amplifier in front of voltage comparators is needed, which makes it possible that the pulse width is maintained extremely precisely. The data transmission is immune from the fast variation in the order of magnitude of 10 kV/$\mu$s of the potential difference between the voltage supplying sources for the input and the output circuits. By the invention a digital data transmission up to the frequency of 100 MHz is rendered possible.

7 Claims, 4 Drawing Sheets

ISOLATION INTERFACE WITH CAPACITIVE BARRIER AND METHOD FOR TRANSMITTING A SIGNAL BY MEANS OF SUCH ISOLATION INTERFACE

The present invention relates to an isolation interface with a capacitive barrier comprising, at the input end of the capacitive barrier, an input circuit with differential outputs for a first and a second logical output signals that are complementary to one another and are replicas of a transmitted input signal, and a first and a second barrier capacitors for the first and the second logical signals, respectively, and, at the output end of the capacitive barrier, an output circuit with inputs for a first and a second logical signal transmitted across the capacitive barrier, the said output circuit comprising a first and a second voltage comparators. The present invention also relates to a method for transmitting a signal by means of such isolation interface.

An isolation interface renders possible data transmitting, normally in the digital form, between two or several circuits having separate supplying voltage sources. Since these circuits have no common mass connection, between them a voltage difference results, which may attain even a value of several kilovolts and may vary very fast so that the voltage difference variation rate attains the order of magnitude of 10 kV/$\mu$s.

In isolation interfaces the transient electrical currents between circuits are inhibited by means based on different physical principles.

The most common one is an optical isolation interface. An input circuit light emitting diode transforms an electrical signal into light pulses that are transformed by an output bipolar transistor back into an electrical signal. Except in the high-price range, the optical isolation interface makes possible only a relatively low data transmission rate on the level of several megahertz and the current consumption of said elements thereof is rather high.

A fast acceptance has been gained by an interface with a magnetic coupling between a magnetic loop and a magnetic field sensor. The magnetic unit can be advantageously fabricated on a single substrate for an integrated circuit; the magnetic loop is a conductive track that is, through a silicon dioxide, separated from the elements that are connected to another voltage supply; the magnetic field sensor is a magneto-resistor. A data transmission at a rate up to 50 MHz is made possible. When appropriately constructed, its current consumption is lower than that of an optical isolation interface. However, it is fabricated according to a relatively pretentious technology since the magneto-resistor is added to the integrated circuit in demanding and high-cost technological steps.

Figure 1:
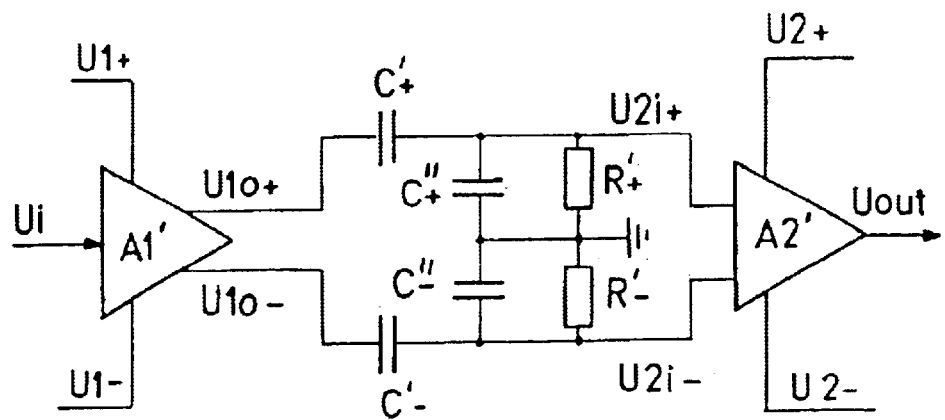

There are also known isolation interfaces using a capacitive coupling. In a basic embodiment two opposite-in-phase digital output signals U1$o\pm$, being replicas of a transmitted input signal Ui, of an input circuit A1' are conducted to a first plate of either barrier capacitor C'$\pm$ (FIG. 1). From their second plate digital input signals U2$i\pm$ are conducted to an output circuit A2', at whose output a transmitted output signal Uout appears. The high and low potential of a supplying voltage source for the input circuit A1' are U1+ and U1−, respectively, as well as U2+ and U2−, respectively, for the output circuit A2'. A second plate of either barrier capacitor C'$\pm$ is through a capacitor C"$\pm$ s as well as through a resistor R'$\pm$, each of said connections representing a voltage divider, namely the first one for a time varying signal and the second one for a direct voltage signal, connected to a common potential of the supplying voltage source for the output circuit A2'. The time development of the input signal voltage Ui with regard to the said common potential is represented in a first window of FIG. 2; at t=90 ns the potential difference between the supplying source for the first circuit A1' and the supplying source for the second circuit A2', resulting in a voltage on the capacitors C'+ and C'−, started to grow and reached the 50 V level. By a full line and a dashed line in a second and third window of FIG. 2 there are represented time developments of the opposite-in-phase digital signals U1$o\pm$ and U2$i\pm$. In a fourth window of FIG. 2, however, the transmitted output signal Uout is represented, whose frequency is equal to the frequency of the input signal Ui. Direct and low-frequency potential differences are limited in magnitude only by the break-down strength of the capacitors C'+ and C'−. The resistors R'$\pm$ ensure that, as regards the magnitude, also at low frequencies the input signals U2$i\pm$ are always within the range of allowed input voltages for voltage comparators in the circuit A2'. In numerous applications, however, the described interface must also function under fast variations of the potential difference between the supplying source of the first circuit A1' and the supplying source of the second circuit A2'. The necessary lowering of the high-frequency signals U2$i\pm$ is reached by an appropriate ratio of the capacitances of the capacitors C'+, C"+ and C'−, C"−, respectively. This ratio must be 1:500 if the described interface should manage a voltage difference of 1 kV at a tolerated input voltage of 2 V for the voltage comparator. Such ratio, however, also lowers the amplitude of the signal replicas U2$i\pm$ of the input signal Ui at the input to the circuit A2' to only a few millivolts. Hereby the signal transmission rate is retarded or even made impossible because the signal amplitudes are already in the range of characteristic offset voltages of a voltage comparator. Hence, if the insensitivity to a fast variation of the potential difference between the two supplying sources is ensured by the described interface it is not possible at the same time to ensure the fastest possible data transmission.

In the U.S. Pat. No. 4,835,486 there is actually disclosed an interface provided with a capacitive coupling suitable for to a digital signal transmission up to the frequency of 1.5 MHz. A differentiating unit at the capacitive barrier is used, however, the time constant of the differentiating unit is 9 ns. So the time constant is longer than the characteristic time of variations of a signal replica at the output of a first circuit in front of the capacitive barrier and therefore the amplitude of the signal replica has to be limited by a diode limiter at an input of a circuit behind the capacitive barrier. Further, an input amplifier in the circuit behind the capacitive barrier transforms the signal pair into one single signal. Hereby the pulse width is additionally distorted since a complete symmetry in the amplifier output signal variation can never be provided for.

In the isolation interface with the capacitive coupling a limitation is immanent that no non-varying-in-time information can be transmitted thereby because of the capacitive barrier. Therefore after a switching-on or, when for a long time no change of the output signal of the circuit at the input end of the capacitive barrier has taken place, after a first change in the logical state of the output signal of the circuit at the output end of the capacitive barrier, the signal at the output end of the capacitive barrier is put into the right logical state, that is into the logical state of the said output signal.

Consequently, the technical problem to be solved by the present invention is to find such a low price interface with a capacitive barrier and a method for transmitting a signal by means of such an isolation interface that between circuits at the input end and at the output end of the capacitive barrier even the fastest data transmission will be made possible, whereat in the circuit at the input end a signal will be formed which will be the most appropriate input signal for the circuit at the output end and the transmission will be insensitive to a very fast variation of the electrical potential difference, even in the range of 10 kV/$\mu$s, between the supplies of the said input and output circuits, and at the same time the isolation interface with the capacitive barrier should be completed so that the receiving circuit will pass to the right logical state immediately after its switching-on and it will stay in the right state also when for a long time no change of the output signal of the circuit at the input end of the capacitive barrier has taken place.

The technical problem is solved by an isolation interface with a capacitive barrier, comprising at the input end of the capacitive barrier, an input circuit with differential outputs for a first and a second logical output signals, respectively, that are replicas of a transmitted input signal and are complementary to one another, a first and a second barriers capacitor for the first and second logical signals, respectively, at the output end of the capacitive barrier an output circuit with inputs for a first and second logical input signal, respectively, that are complementary to one another, which output circuit comprises a first and a second voltage comparators, the isolation interface of the invention with the capacitive barrier being characterized in that in the input circuit a first and a second integrating units are provided, across which the first logical output signal and the second logical output signal, respectively, passed and by means of whose time constants the slope rates of the edges of the signals or the rising and falling-off times of the signals were adjusted, and that to an output terminal of the first and the second barrier capacitors on the one hand and to a common potential terminal of the output circuit on the other hand such a first resistor and a second resistors, respectively, are connected, that the time constant of a first differentiating unit made of the first barrier capacitor and of the first resistor and the time constant of the second differentiating unit made of the second barrier capacitor and of the second resistor are shorter than the rising and falling-off times of the logical output signals being the replicas of the transmitted input signal.

The isolation interface of the invention with a capacitive barrier is further characterized in that the first logical input signal and the second logical input signal of the output circuit are conducted directly to a first and a second inputs, respectively, of the first voltage comparator as well as to a second and first inputs, respectively, of the second voltage comparator and that an output of the first voltage comparator and an output of the second voltage comparator are connected to inputs of a flip-flop, whose output is an output of the isolation interface with the capacitive barrier.

The isolation interface of the invention with a capacitive barrier is completed so that an input of the basic isolation interface of the invention with a capacitive barrier is connected to a control input of a pulse-width modulator, to whose second input a constant frequency signal is uninterruptedly conducted and whose output is connected to an input of an auxiliary isolation interface provided for transmission over an auxiliary communication channel, and that the output of the basic isolation interface with the capacitive barrier and an output of the auxiliary isolation interface for the transmission over the auxiliary communication channel are connected to inputs of a decision logical circuit that provides for a correct logical state of the signal transmitted by the basic isolation interface with the capacitive barrier and that an output of the decision logical circuit is the output of the isolation interface with the capacitive barrier.

The completed isolation interface of the invention with a capacitive barrier is further characterized in that individual output end units of the basic isolation interface with the capacitive barrier are turned on or off depending upon the presence of the modulated signal at the output of the auxiliary isolation interface for the transmission over the auxiliary communication channel.

The technical problem is also solved by a method for transmitting a signal through an isolation interface with a capacitive barrier, the method of the invention being characterized in that in an input circuit of the isolation interface with the capacitive barrier by means of the integration with an appropriate time constant the slope rates of the edges or the rising and falling-off times of signal replicas of the transmitted input signal are adjusted and that the said signal replicas are differentiated in a first differentiating unit and a second differentiating unit, respectively, of the capacitive barrier and that the time constants of the first and the second differentiating units are shorter than the rising and falling-off times of the signal replicas of the transmitted input signal.

The method of the invention for transmitting of signal through the isolation interface with the capacitive barrier is further characterized in that signals of the derivatives generated in the differentiating units of the capacitive barrier are conducted directly to two voltage comparators comprised in an output circuit of the isolation interface with the capacitive barrier.

The completed inventive method for transmitting a signal through the isolation interface with the capacitive barrier is characterized in that, besides transmitting the input signal through a basic isolation interface with the capacitive barrier, there is uninterruptedly performed a transmitting of a constant frequency signal that is pulse-width-modulated by the transmitted input signal, through an auxiliary isolation interface for transmission over an auxiliary communication channel is performed and that, with regard to the modulation of the transmitted pulse-width-modulated signal, the logical state of an output signal transmitted by the isolation interface with the capacitive barrier is adjusted.

The invention will now be disclosed in more detail and numerous advantages achieved will be presented by way of describing an embodiment of an isolation interface with a capacitive barrier and of a method performed by the interface for transmitting a signal and with reference to the accompanying drawings and graphs representing in FIG. 1 a schematic presentation of the prior art isolation interface using a capacitive coupling.

Figure 2:
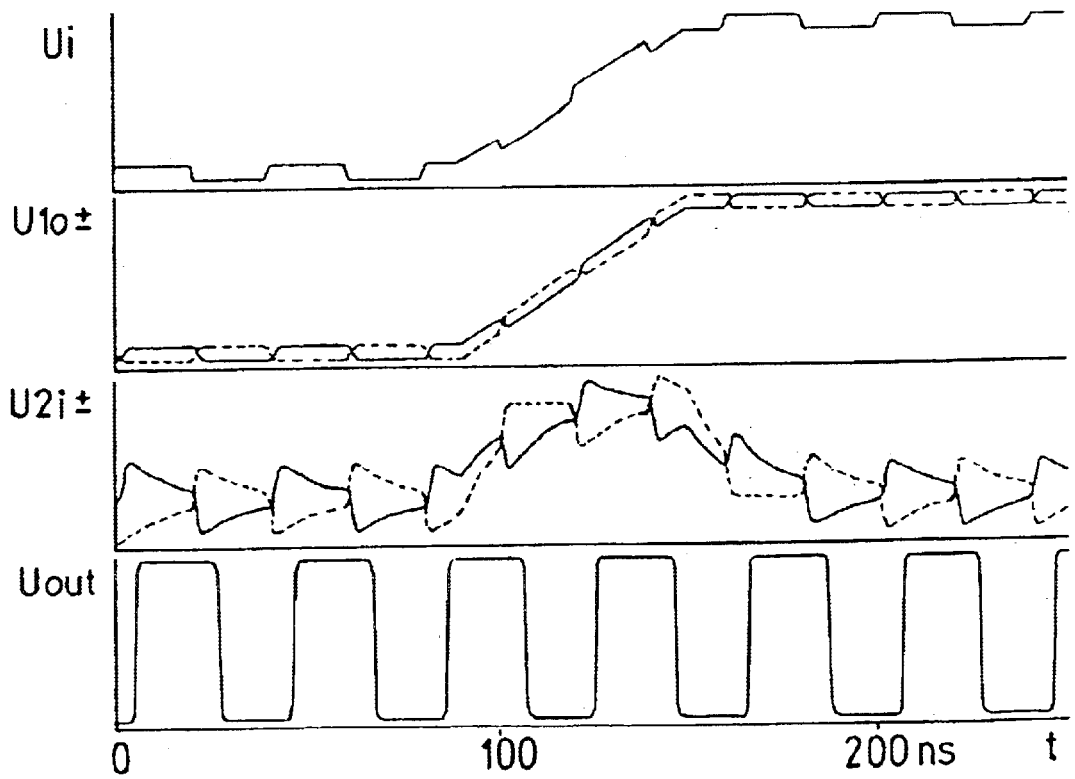

FIG. 2 the time development of various signals for the isolation interfaces of FIG. 1.

Figure 3:
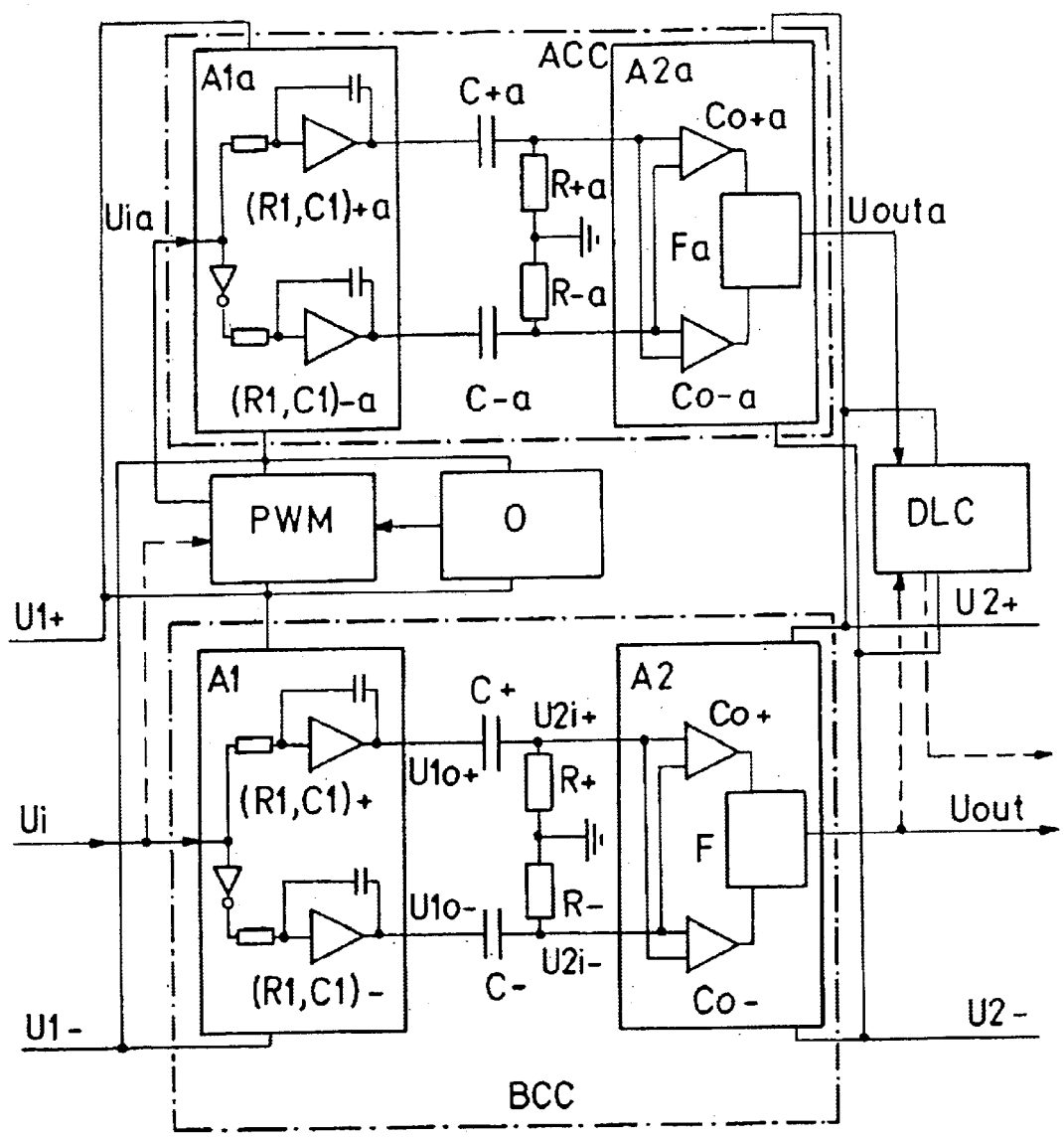
Figure 4:
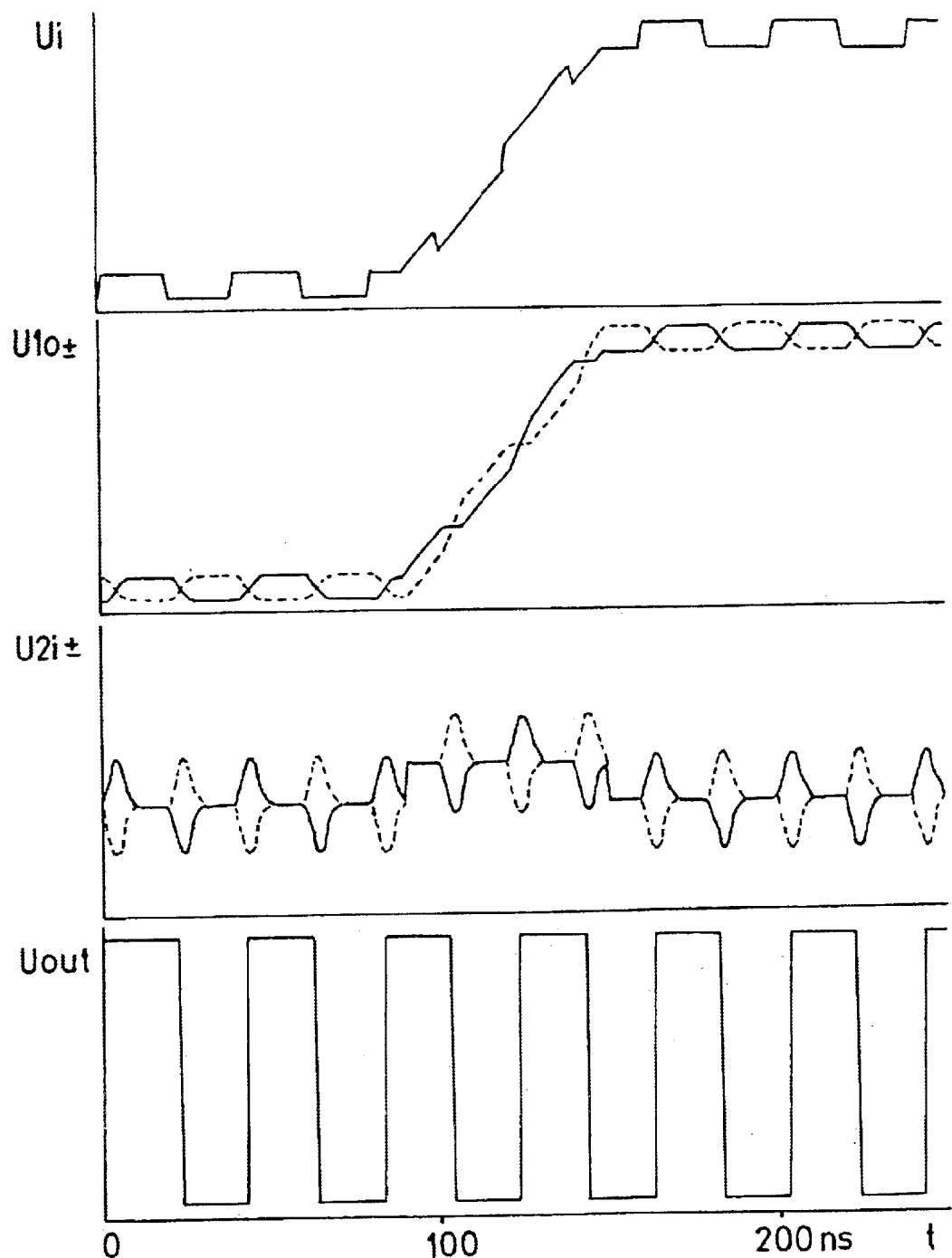
Figure 5:
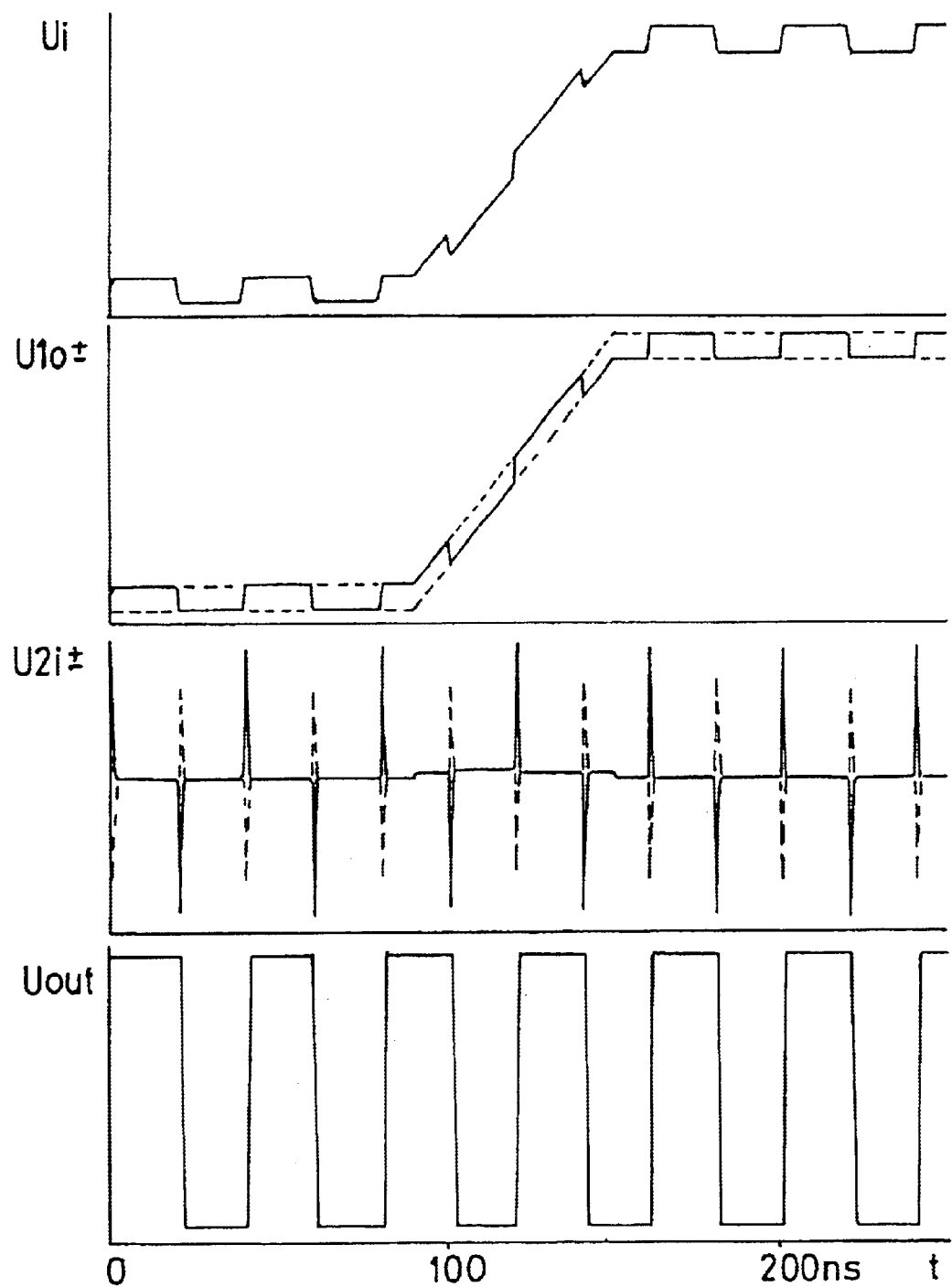

FIG. 3 a schematic presentation of an isolation interface as completed by the invention, wherein to a basic isolation interface of the invention with a capacitive barrier a pulse-width modulator and an auxiliary isolation interface for transmitting a constant frequency signal that is modulated by an input signal are connected in order to transmit the information on the logical state of the transmitted signal;

FIG. 4 the time development of an input signal and the time development of signal replicas of the input signal as obtained by the isolation interface of the invention with a capacitive barrier, the replicas having in front of a differentiating unit and behind it the edges with the slope rate of 1 V/ns, as well as the time development of an output signal;

FIG. 5 the time development of the same signals as in FIG. 4 with input signal replicas having the slope rate of 12 V/ns.

The basic isolation interface of the invention with a capacitive barrier is represented in a simplified form as a part of the circuit in FIG. 3. It comprises the following units.

At the input end of the capacitive barrier an input circuit A1 with differential outputs for a first and a second logical output signals U1o+ and U1o−, respectively, that are replicas of a transmitted input signal Ui and are complementary to one another. In the input circuit A1 a first integrating unit (R1, C1)+ and a second integrating unit (R1, C1)− are provided, across which the first logical output signal U1o+ and the second logical output signal U1o−, respectively, have passed. By means of the time constants of the integrating units (R1, C1)± the slope rates of the edges of the signals U1o± or the rising and falling-off times of the signals U1o± are adjusted.

There follow a first barrier capacitor C+ and a second barrier capacitor C−, whereto the first logical signal U1o+ and the second logical signal U1o+ are conducted and to whose output terminal on the one hand and to a common potential terminal of an output circuit A2 on the other hand such first resistor R+ and second resistor R−, respectively, are connected that the time constant of a first differentiating unit (C+, R+) made of the first barrier capacitor C+ and of the first resistor R+, and the time constant of a second differentiating unit (C−, R−) made of the second barrier capacitor C− and of the second resistor R−, are shorter than the rising and falling-off times of the logical output signals U1o+ and U1o− being the replicas of the transmitted input signal Ui. Hence, in the proposed isolation interface for transmitting a digital signal with the frequency up to 100 MHz the time constants of the first and the second differentiating circuits are of the order of magnitude 1 ns or even below. In the first differentiating circuit (C+, R+) the signal U1o+ is transformed into a signal U2i+ and on the second differentiating circuit (C−, R−) the signal U1o− is transformed into a signal U2i−. The signals U2i± are also complementary to one another.

At the output end of the capacitive barrier an output circuit A2 with inputs for a first logical input signal U2i+ and a second logical input signal U2i−, respectively, is provided. The output circuit A2 comprises a first voltage comparator Co+ and a second voltage comparator Co−.

The high and the low potential of the supplying voltage source for the input circuit A1 are U1± and for the output circuit A2 there are U2±.

According to the invention the time constants of the integrating units (R1, C1)± are chosen so that the slope rates of the edges of the signals U1o± or the rising and falling-off times of the signals U1o± are adjusted in such a way that these times are longer than the time constants of the first and the second differentiating units, respectively, which, however, should be in the order of magnitude of 1 ns or even below.

Namely by controlling the slope rates of the edges of the output signals U1o± of the circuit A1, the amplitude and the time duration of the input signals U2i± of the circuit A2 are controlled. Out of the signals U1o± with lower slope rates of the edges, e.g. with the slope rate of 1 V/ns in FIG. 4, lower signals U2i± with a longer time duration arise. And the other way round, out of the signals U1o± with steeper edges, e.g. with the slope rate of 12 V/ns in FIG. 5, higher signals U2i± with a short time duration arise.

For the slope rates of 1 V/ns and 12 V/ns of the edges in FIGS. 4 and 5, respectively, in the first two windows the time development of the input signal Ui and of the output signals U1o± of the circuit A1 and in the last two windows the time development of the input signals U2i± of the circuit A2 and of the output signal Uout of the circuit A2 are represented. At t=90 ns the potential difference between the supplying source of the first circuit A1 and the supplying source of the second circuit A2 started to grow and at t=150 ns reached the value of 50 V. The input signals U2i± of the circuit A2 (third window) consist of 50 mV pulses with the time duration of 10 ns for the slope rate of 1 V/ns of the edges of the signals U1o± (FIG. 4) and of approximately 600 mV pulses with the time duration of 1 ns for the slope rate of 12 V/ns of the edges of the signals U1o± (FIG. 5).

In the output circuit A2 the first logical input signal U2i+ and the second logical input signal U2i− are conducted directly to a first and a second inputs, respectively, of the first voltage comparator Co+ as well as to a second and first inputs, respectively, of the second voltage comparator Co−.

An output of the first voltage comparator Co+ and an output of the second voltage comparator Co− are connected to inputs of a flip-flop F. The output of the flip-flop F is at the same time an output of the basic isolation interface of the invention with the capacitive barrier.

As shown above, with regard to the characteristics of the comparators Co± and also to the maximum speed of the data transmission as well as to the immunity from fast varying potential difference between the supplying sources of the circuits A1 and A2, the most favourable input signals U2i± for the output circuit A2 are generated.

The time constants of the differentiating units (C+, R+) and (C−, R−), however, are chosen with regard to the maximum variation rate of the potential difference between the voltage supplying sources of the circuits A1 and A2. If this maximum variation rate is 10 kV/μs, the dimensioning of the differentiating units must be such that the said varying potential difference results in direct voltages on the inputs of the circuit A2 lying within the range of values tolerable for this circuit. Namely, the amplitude of the signals U2i± depends only on the variation rate of the signals U1o± and not on their amplitude.

In the isolation interface of the invention with the capacitive barrier the circuit A2 is never overloaded by input signals U2i± since according to the invention their amplitudes and time durations can be altogether exclusively determined by just the rising times and the falling-off times of the signals U1o± and by the time constants of the first and the second differentiating units. However, in modem submicrometer technologies the signal variation rate is in the region from 1 V/ns to 10 V/ns. The time constants of the differentiating units are strongly shortened and, preferably, they are below 1 nanosecond.

Since the amplitudes of the input signals U2i± are adjustable and therefore known, in the circuit A2 no amplifiers in front of the voltage comparators Co± are needed. This makes it possible that the pulse width is conserved from the circuit A1 to the circuit A2 extremely accurately, an error being below 0.5 ns, since the complementary signals U2i± are received by two equal comparators Co±, the first one sensing a transition from the state 0 into the state 1 and the second one sensing a transition from the state 1 into the state 0.

By the isolation interface of the invention with the capacitive barrier a digital data transmission up to the frequency of 100 MHz is rendered possible, which represents an improvement of the state of the art for two orders of magnitude.

By the isolation interface of the invention with the capacitive barrier two great problems of the data transmission have been solved: p1 the isolation interface of the invention is immune from the fast variation in the order of magnitude of 10 kV/µs of the potential difference between the supplying voltage sources for the circuits A1 and A2 so that this potential difference variation is reflected on the input signals U2i± as a non-disturbing direct voltage contribution below 1 volt;

just by the form of the mutually opposite in phase output signals U1o± of the circuit A1, the form of the input signals U2i± of the circuit A2 is determined.

In FIG. 3 the completed isolation interface of the invention with a capacitive barrier is represented, wherein, besides the basic isolation interface (A1, C+, C−, R+, R−, A2) of the invention with a capacitive barrier for fast data transmission over the basic communication channel BCC, also an auxiliary isolation interface for transmission over an auxiliary communication channel (ACC) is comprised. As the auxiliary isolation interface there can be used the described isolation interface (A1, C+, C−, R+, R−, A2) of the invention with a capacitive barrier or an isolation interface with a lower attainable data transmission rate and therefore having a substantially lower electrical current consumption.

The input of the basic isolation interface (A1, C+, C−, R+, R−, A2) with the capacitive barrier is connected to a control input of a pulse-width modulator PWM, to whose second input a constant frequency signal, e. g. from an oscillator O, is uninterruptedly conducted. An output signal of the pulse-width modulator PWM modulated by the input signal Ui to be transmitted is conducted to an input of the auxiliary isolation interface provided for the transmission over the auxiliary communication channel ACC.

At the output of the auxiliary communication channel ACC an auxiliary output signal Uouta is uninterruptedly present. In this signal the ratio between the high logical level time duration and the low logical level time duration is not constant. If the input signal Ui is in the high logical level, the output signal Uouta, for example, has the high logical level in a longer period portion and the low logical level in a shorter period portion and the situation is reversed if the input signal Ui is in the low logical level. The always present data on the ratio between the durations of the high and the low logical levels of the constant frequency pulse-width-modulated signal Uouta represents an information on the logical state of the signal Ui at the input of the emitting part of the completed isolation interface with the capacitive barrier.

In this way the emitting part of the isolation interface conveys important additional information to the receiving part on the other side of the isolation barrier. Namely, the data receiving part, which is the main electrical current consumer in the receiving circuit, can be turned off when the emitting part is not active, or the input of the receiving part is readjusted by means of the said information when the input signal Ui has not changed for a longer time, from 1 µs to 100 µs, or immediately after turning on the receiving part sets the right logical state of its own signal or initializes the output signal of the receiving part as soon as it has determined the logical state of the input signal Ui of the emitting part. Hence, to adjust the right logical state of the output signal in the receiving part of the completed isolation interface with the capacitive barrier it is not necessary to wait for the first change of the signal from the emitting part.

To this end the output of the basic isolation interface (A1, C+, C−, R+, R−, A2) with the capacitive barrier and the output of the auxiliary isolation interface for transmission over the auxiliary communication channel ACC are connected to inputs of a decision logical circuit DLC that provides for a correct logical state of the signal transmitted. The output of the decision logical circuit DLC is the output of the isolation interface with the capacitive barrier.

What is claimed is:

1. Isolation interface with a capacitive barrier, comprising at the input end of the capacitive barrier an input circuit (A1) with differential outputs for a first and a second logical output signals U1o+ and U1o−, respectively, that are replicas of a transmitted input signal Ui and are complementary to one another, a first barrier capacitor (C+) and a second barrier capacitor (C−) for the first and second logical signals U1o+ and U1o−, respectively, at the output end of the capacitive barrier, an output circuit (A2) with inputs for a first logical input signal U2i+ and a second logical input signal U2i−, respectively, that are complementary to one another, and the output circuit (A2) comprises a first voltage comparator (Co+) and a second voltage comparator (Co−), and characterized in that in the input circuit (A1) a first integrating unit (R1, C1)+ and a second integrating unit (R1, C1)− are provided, across which the first logical output signal U1o+ and the second logical output signal U1o−, respectively, passed and by means of whose time constants the slope rates of the edges of the signals U1o± or the rising and falling-off times of the signals U1o± were adjusted, and that to an output terminal of the first barrier capacitor (C+) and of the second barrier capacitor (C−) on the one hand and to a common potential terminal of the output circuit (A2) on the other hand, such a first resistor (R+) and a second resistor (R−) are connected that the time constant of a first differentiating unit (C+, R+) made of the first barrier capacitor (C+) and of the first resistor (R+)

and the time constant of the second differentiating unit (C−, R−) made of the second barrier capacitor (C−) and of the second resistor (R−)

are shorter than the rising and falling-off times of the logical output signals U1o+ and U1o− being the replicas of the transmitted input signal Ui.

2. Isolation interface with a capacitive barrier as recited in claim 1, characterized in that the first logical input signal U2i+ and the second logical input signal U2i− of the output circuit (A2) are conducted directly to a first and a second inputs respectively, of the first voltage comparator (Co+) as well as to a second and first inputs, respectively, of the second voltage comparator (Co−)

and that an output of the first voltage comparator (Co+) and an output of the second voltage comparator (Co−) are connected to inputs of a flip-flop (F), whose output is an output of the isolation interface with the capacitive barrier.

3. Isolation interface with a capacitive barrier as recited in claim 1, characterized in that an input of the basic isolation interface (A1, C+, C−, R+, R−, A2) with a capacitive barrier is connected to a control input of a pulse-width modulator (PWM), to whose second input a constant frequency signal is uninterruptedly conducted and whose output is connected to an input of an auxiliary isolation interface provided for transmission over an auxiliary communication channel (ACC), that the output of the basic isolation interface (A1, C+, C−, R+, R−, A2) with the capacitive barrier and an output of the auxiliary isolation interface for transmission over the auxiliary communication channel (ACC) are connected to inputs of a decision logical circuit (DLC) that provides for a correct logical state of the signal transmitted by the basic isolation interface (A1, C+, C−, R+, R−, A2) with the capacitive barrier, and that an output of the decision logical circuit (DLC) is the output of the isolation interface with the capacitive barrier.

4. Isolation interface with a capacitive barrier as recited in claim 3, characterized in that individual output end units of the basic isolation interface (A1, C+, C−, R+, R−, A2) with the capacitive barrier are turned on or off depending upon the state of the modulated signal at the output of the auxiliary isolation interface for the transmission over the auxiliary communication channel (ACC).

5. Method for transmitting a signal through an isolation interface with a capacitive barrier, characterized in that in an input circuit of the isolation interface with the capacitive barrier by means of an integration with an appropriate time constant the slope rates of the edges or the rising and falling-off times of signal replicas U1$o$+ and U1$o$− of the transmitted input signal Ui are adjusted and that said signal replicas U1$o$+ and U1$o$− are differentiated in a first differentiating unit and in a second differentiating unit, respectively, of the capacitive barrier, and that the time constants of the first and the second differentiating unit are shorter than the rising and falling-off times of the signal replicas U1$o$+ and U1$o$−, respectively, of the transmitted input signal Ui.

6. Method for transmitting a signal through an isolation interface with a capacitive barrier as recited in claim 5, characterized in that signals U2$i$± of the derivatives performed in the differentiating units of the capacitive barrier are conducted directly to two voltage comparators comprised in an output circuit of the isolation interface with the capacitive barrier.

7. Method for transmitting a signal through an isolation interface with a capacitive barrier as recited in claim 5, characterized in that, besides transmitting the input signal Ui through the basic isolation interface with the capacitive barrier, there is uninterruptedly performed the transmitting of a constant frequency signal Uia, which is pulse-width-modulated with the transmitted input signal Ui, through an auxiliary isolation interface for transmission over an auxiliary communication channel (ACC) and that according to a modulation of the transmitted pulse-width-modulated signal Uouta, the logical state of an output signal Uout transmitted by the isolation interface with the capacitive barrier is adjusted.

* * * * *